US007503369B2

(12) United States Patent
Yang et al.

(10) Patent No.: US 7,503,369 B2

(45) Date of Patent: Mar. 17, 2009

(54) ELECTRIC PAPER REINFORCER/HOLE PUNCHER (EPRHP)

(76) Inventors: Luyu Yang, 19 Sherbrook St., Tyngsborough, MA (US) 01879; Melinda Carlson, 19 Sherbrook St., Tyngsborough, MA (US) 01879

( * ) Notice: Subject to any disclaimer, the term of this patent is extended or adjusted under 35 U.S.C. 154(b) by 0 days.

(21) Appl. No.: 11/049,392

(22) Filed: Feb. 3, 2005

(65) Prior Publication Data

US 2006/0171773 A1 Aug. 3, 2006

(51) Int. Cl.

*B32B 38/04* (2006.01)
*B29C 65/48* (2006.01)
*B65C 1/02* (2006.01)

(52) U.S. Cl. ........................ 156/513; 156/253; 156/516; 156/541

(58) Field of Classification Search .................. 156/251, 156/252, 253, 261, 265, 513, 514, 515, 518, 156/299, 541, 560

See application file for complete search history.

(56) References Cited

U.S. PATENT DOCUMENTS 2,285,447 A * 6/1942 Lichter ........................ 156/521
3,732,061 A * 5/1973 Hackley ....................... 432/16
4,028,170 A * 6/1977 Savarimuthu ............... 156/513
4,662,770 A * 5/1987 Block ........................ 402/80 R
4,826,561 A * 5/1989 Carroll ....................... 156/518

* cited by examiner

*Primary Examiner*—Mark A Osele

(57) ABSTRACT

We have designed a machine for office use called the Electric Paper Reinforcer/Hole Puncher (EPRHP) to protect the printed document. EPRHP is an electric powered device that can automatically apply a clear, ultra thin layer of plastic film on the edge of printed documents to reinforce them, and then punch 3 holes within the plastic film area on these documents. As a result, these 3 holes will be reinforced and prevent the documents from being torn by the rings of the binder. EPRHP can be further used to reinforce large sized printed drawings by applying the plastic film on the edge of drawings. The EPRHP is a portable machine and can be placed on an office desk. EPRHP can turn a document printed on a piece of regular bond paper into a durable document, without deforming the paper appearance or creating any winkles on the paper.

10 Claims, 4 Drawing Sheets

ELECTRIC PAPER REINFORCER / HOLE PUNCHER (NO COVER)
NORTH-WEST ISOMETRIC VIEW

ELECTRIC PAPER REINFORCER / HOLE PUNCHER (NO COVER)
SOUTH-EAST ISOMETRIC VIEW

ELECTRIC PAPER REINFORCER / HOLE PUNCHER (NO COVER)
NORTH-WEST ISOMETRIC VIEW

ELECTRIC PAPER REINFORCER SHOWN ONLY
SOUTH-EAST ISOMETRIC VIEW

ELECTRIC PAPER REINFORCER SHOWN ONLY
NORTH-WEST ISOMETRIC VIEW

PROCESS OF PRODUCING A REINFORCED 3-HOLE DOCUMENT PAPER

PROCESS OF REINFORCING A LARGE SIZED DOCUMENT

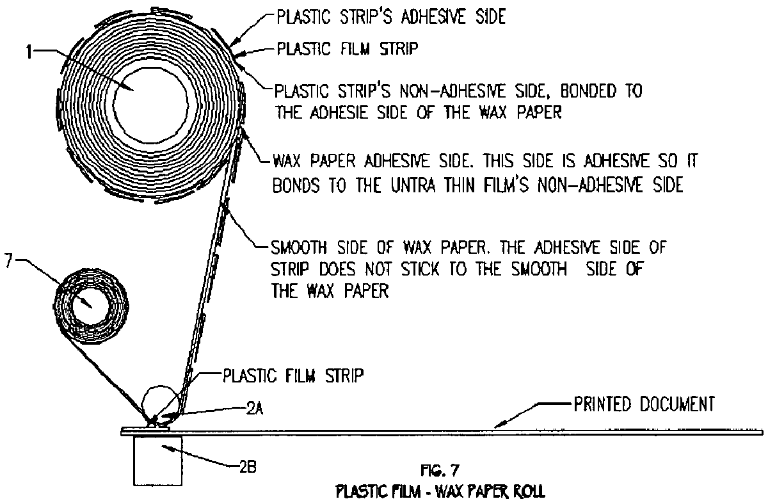

FIG. 7
PLASTIC FILM - WAX PAPER ROLL

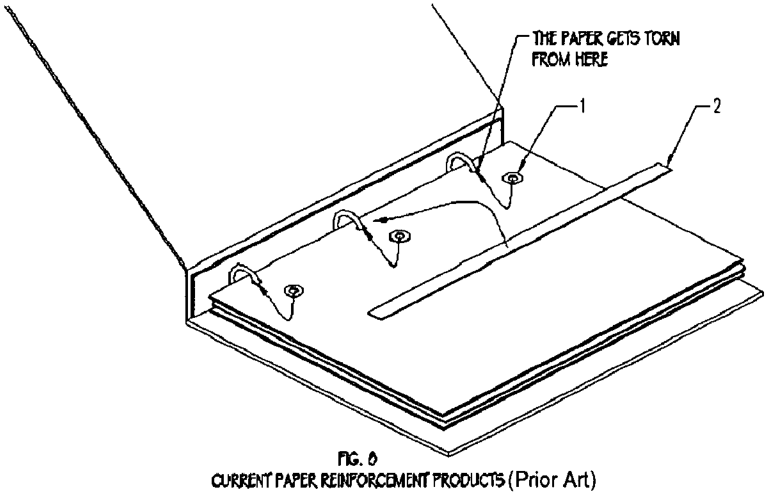

FIG. 8
CURRENT PAPER REINFORCEMENT PRODUCTS (Prior Art)

1. PAPER HOLE REINFORCEMENT. MADE BY 3M, AVERY AND UNIVERSAL. USERS HAVE TO LINE UP THE RE-ENFORCEMENTS HOLE WITH THE PAPER HOLE AND APPLY IT MANUALLY ON THE PAPER HOLE. THE PROCESS IS TIME CONSUMING. IT ALSO AFFECTS THE PAPER'S APPERANCE.
2. PAPER STRIP. DESIGNED TO REPAIR BADLY DAMAGED 3-HOLE PAPER. THE USERS HAVE TO APPLY IT MANUALLY TO THE PAPER EDGE, AND RE-PUNCH THE HOLES ON THE PAPER. THIS PRODUCT HAS THE SAME PROBLEMS AS THE FIRST ONE: TIME CONSUMING AND MAKES THE PAPER LOOK UNPROFESSIONAL.

ELECTRIC PAPER REINFORCER/HOLE PUNCHER (EPRHP)

DESCRIPTION

1. Field of Invention

The invention relates to a paper reinforcing and paper hole punching apparatus for documents and drawings, particularly designed for office use, to improve the efficiency of office workers and enhance the durability of their documents. This invention particularly changes the paper reinforcement process from a manual, time consuming and low quality process to an automatic, efficient and high quality process.

2. Background of the Invention

As software and printing technologies advance, technical and marketing firms are capable of producing their own professional grade reports and presentations efficiently. Preparing and organizing these paper documents in a 3-ring binder is one of the most common methods to store and present the reports and presentations in the office. But the common problem associated with using 3-ring binders concerns the holes of some papers, where often the most important and most frequently reviewed documents got torn. Examples include a sign off sheet, a protocol paper and record paper that requires many people's review and their initials and signatures. A torn paper will affect the report and presentation appearance and might even get lost from the binder. In addition, the torn paper might negatively impact the image of the person or organization that prepares the binder.

To solve this problem, there are several paper reinforcement products available on the market which are designed to reinforce printed documents stored in 3-ring binders. Examples include paper hole reinforcements, made by manufacturers such as 3M, Avery and Universal. These products allow the user to manually apply the self adhesive reinforcement (white or clear) over the paper holes. Another similar product is the Clear Mylar Reinforcing Strips, made by Keysan. This product is made for repairing a piece of torn paper. It allows the user to manually apply a paper strip on the torn paper edge, and then re-punch 3 holes on the strip. There are several problems associated with these products: 1. they are time consuming. With the paper hole reinforcement, for instance, people usually do not have the patience to line up and apply the paper hole reinforcement on the three holes of each piece of paper. 2. Deforming and wrinkling the paper will significantly impact the paper's appearance. How the paper looks is very important in the reports and presentations, especially when these reports and presentations will be reviewed by clients and management.

The other paper product made to solve this problem is made by Rediform. These 3-hole blank papers from Rediform come with ultra thin plastic film reinforcement already put on the area along the edge of the paper. These papers have a high quality appearance with the reinforcement on, (which is also provided by this invention). These papers cost approximately \$11/100 sheet, compared to regular bond paper's price: \$10/500 sheets. In addition to the high cost, the other problem with this product is that the users have to put them in the printer tray first before the printing, which is not practical or convenient when a shared network printer is used. Most companies use shared network printers, and regular bond paper is used by these network printers. Most of documents printed from the printer are for users to review only, and will not be stored in the three ring binders. Only some printed documents will be put into the three ring binders by the users. Loading the printers with these expensive, reinforced 3-hole papers is costly and impractical. In some situations, the documents are only available as hard copies, which means the user has to load the Rediform papers in the copy machine in order to make copies with reinforcement, which causes even more inconvenience and is highly inefficient.

The other need of this invention is that, in most engineering firms, construction drawings are often plotted on 11×17 sized papers, and put together into 11×17 sized 3-ring binders. During construction, these binders are frequently reviewed by the engineers in the offices and construction site. These papers are much more easily torn because the engineers frequently check the drawings and make notes on them. These 11×17 drawings are always badly torn even before the construction is begun. However, they are very important because a lot of valuable information is hand-written on them, and they are considered permanent records. Repairing these drawings (with usually over 75 pages of drawings per binder) by using the hole reinforcement or paper reinforcement strips could take up hours of an engineer's valuable time. After construction, the as-built drawings will be put in these 11×17 binders and delivered to the maintenance personnel. These binders will be used as a maintenance manual, which could be used by the maintenance technicians in the field for the next twenty or even thirty years. These drawings are always badly torn after a few field operations and require major paper repair. Using EPRHP to reinforce the drawing set prior to use will eliminate such problems, or using EPRHP will make the paper repair much easier.

Another need of this invention is that, some documents and drawings are not printed on 8½×11 or 11×17 paper, such as a poster and a standard size construction drawing. For instance, the construction drawings are usually plotted on 36×24 sized papers. Since these drawings are being reviewed and marked up so frequently, the edges of the papers are always badly torn. These drawings, with stamps and signatures from the professional engineers, must be kept as a record document and allowed to be copied. This usually requires tremendous paper repair work on these torn drawings after construction. The engineers usually have to apply a clear tape, or the Clear Mylar Reinforcement Strips on the edge of the drawings to reinforce the paper in order to prevent the torn paper edge from jamming the copy machine. There are often more than 100 drawings per construction project. Most of the time, as mentioned above, manually applying reinforcement strips or clear tape on the paper's edge can easily create winkles on the papers. In general, manually apply the paper reinforcement on a 36×24 drawing set with more than 100 drawings could take up a day or more of work, depending on how badly the drawings are torn. This invention could quickly and efficiently perform this task.

BRIEF SUMMARY OF THE INVENTION

Accordingly, the first objective of this invention is to improve the efficiency of the paper reinforcement process. The inventors have designed an apparatus to automatically apply an ultra thin reinforcement film on printed 8½×11 and 11×17 documents without deforming or creating any wrinkles on the paper, and then punch 3-holes within the reinforcement area to prepare these documents for a 3-ring binder.

The second objective of this invention is to allow the office worker to apply the reinforcements and punch holes on multiple pages in a single, automated process, in order to increase the paper reinforcement efficiency. The EPRHP is designed to automatically take one page at a time from a document stack, apply the reinforcement strip on this page, and then punch holes on this page and the reinforcement strip. The process of the paper being transferred into the EPRHP is similar to that which a printer or a scanner uses.

The last objective of this invention is to allow the office workers, using the EPRHP, to automatically apply the paper reinforcement strip along the edge of large sized paper, such as a 36×24 sized drawing, instead of by hand.

To achieve the above objectives, there is provided a paper reinforcement and hole punching apparatus for the office workers. When the EPRHP is used to reinforce a large size drawing, the hole punch function is deactivated and only the film application function is used to apply the film on the paper's edge.

BRIEF DESCRIPTION OF THE DRAWINGS

FIG. 7 shows the plastic film-wax paper roll, indicating how the plastic film strip and wax paper are bonded together.

FIG. 8 shows current paper reinforcement products on the market and how they are used.

DETAILED DESCRIPTIONS OF THE INVENTION

Figure 1:
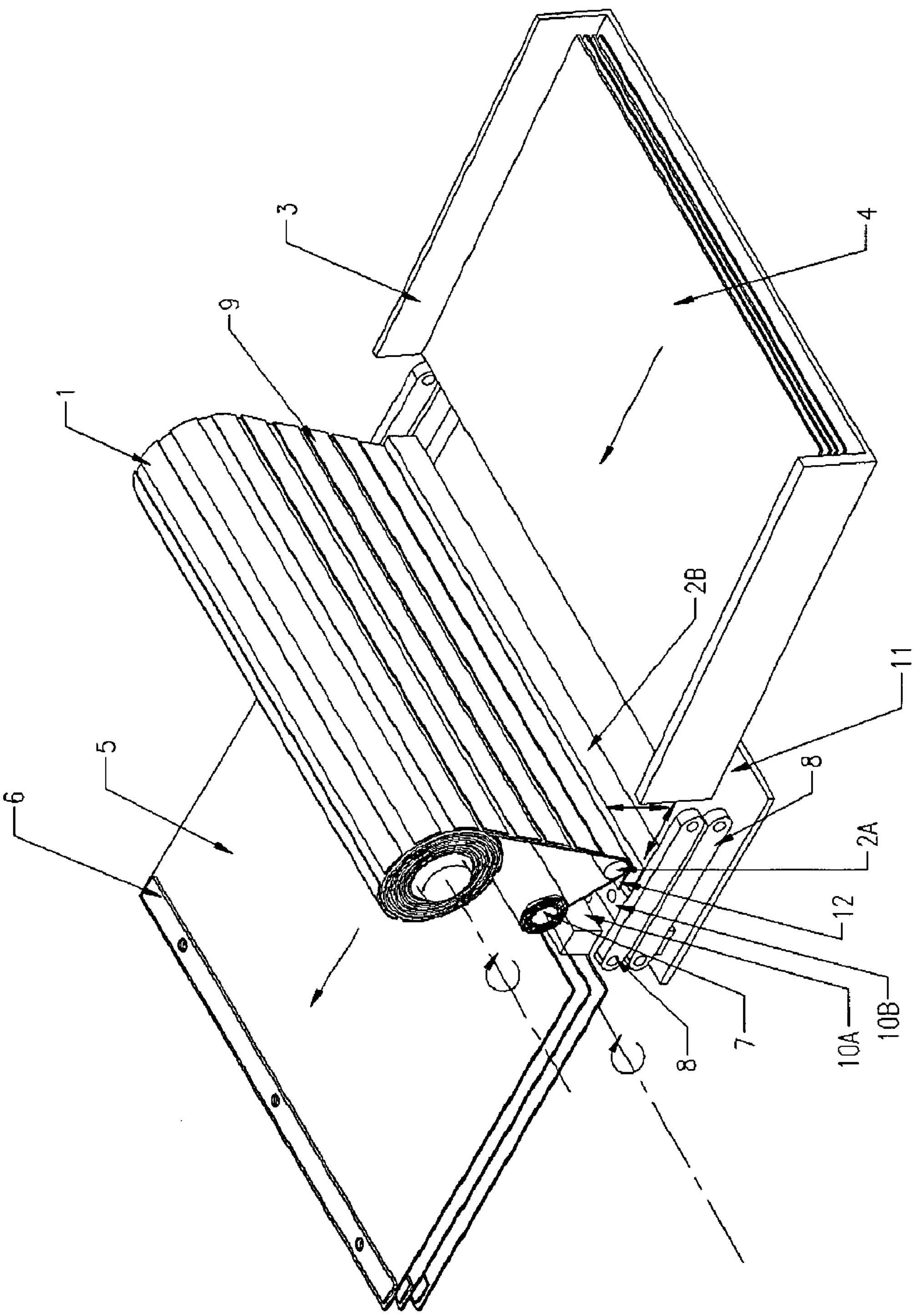
FIG. 1 is the isometric South-East view of the EPRHP. In this figure, the relative dimensions of each part of the apparatus are not respected. It shows the major components in the apparatus.

Refer to FIG. 1. In one embodiment of the invention, the EPRHP comprises the following major components: a plastic film application station (2A, 2B); a 3-hole puncher (10A, 10B); a multiple paper in-feed tray (3); a plastic film-wax paper roll (1); a wax paper rolling station (7); and a paper transfer mechanism (8).

Figure 3:
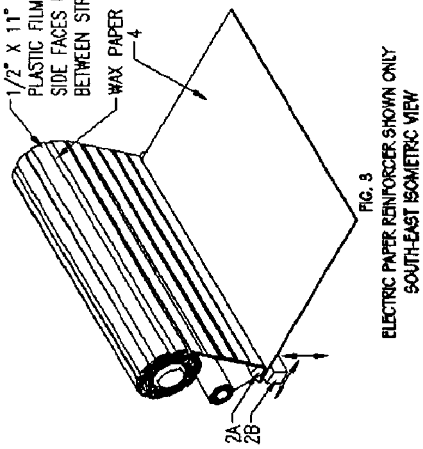
FIG. 3 is the isometric South-East view of the paper reinforcer, only the most important component of this apparatus. It provides an independent view of the paper reinforcer.
Figure 4:
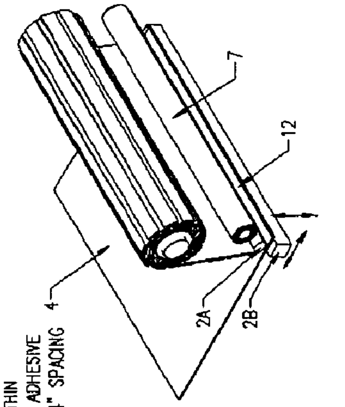
FIG. 4 is the isometric North-West view of the paper reinforcer. It shows the paper reinforcer from the opposite angle.

The plastic film-wax paper roll (1) is made particularly for the EPRHP, and is shown in FIG. 3 and FIG. 7. The plastic strip is 11"×½" that bonds to the wax paper. The strip's smooth, non adhesive side is bonded to the wax paper's sticky side, as shown in FIG. 7, since the plastic strip surface is smooth, the plastic strip can be easily pealed off from the wax paper. The side of the film strip facing up is self-adhesive, though not adhesive to the reverse side of the wax paper, so the roll can be easily unrolled. Each film strip is ½ inch wide and ¼ inch apart from the next strip on the roll.

When the plastic strip is pressed on the paper, the bonding between the paper and the adhesive strip is much stronger than the bonding between the plastic strip and wax paper, so the plastic strip is very easily peeled off from the wax paper. The plastic film-wax paper roll (1) is 3 inches in diameter, and can provide 300 plastic strips.

The typical 3-hole puncher punches a hole with ¼" diameter and the center of the hole is about ⅜" from the edge of paper. EPRHP applies a ½" wide plastic film (strip) on the paper, ⅛" from the paper edge, so these 3 holes will be located within the plastic film and the plastic film surrounds these 3-holes and protects the paper hole from being torn by the 3 rings in the binder.

The common application for the EPRHP is to apply the plastic film on an 8 ½×11 sized printed document. The EPRHP can also be used on a paper that already has 3 punched holes on it and reinforce it. In this case, only the plastic film gets punched in the EPRHP.

Figure 2:
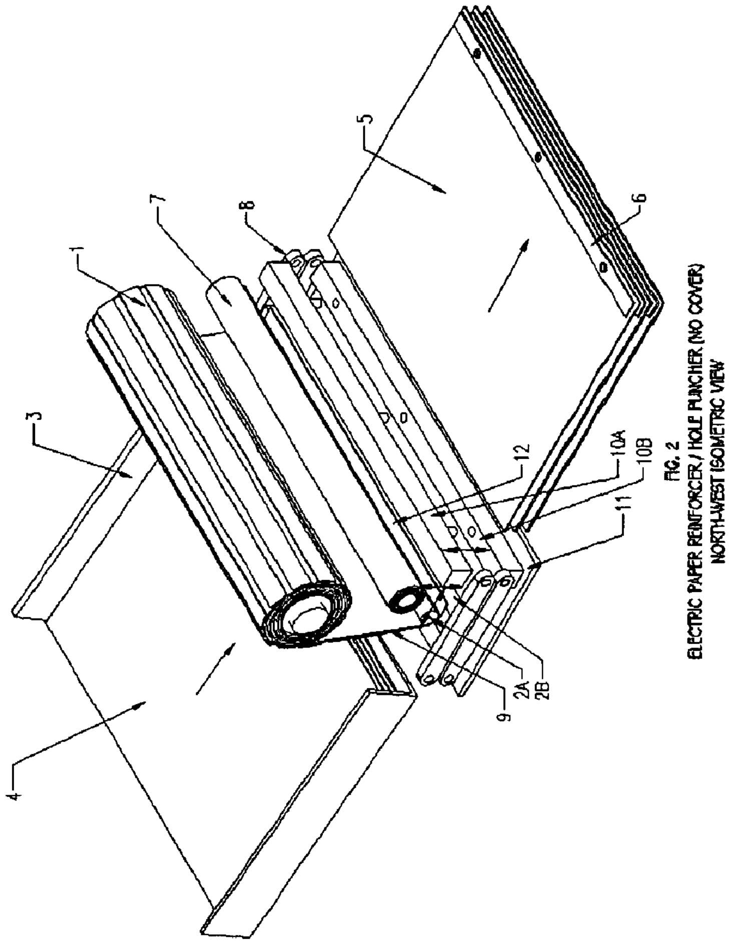
FIG. 2 is the isometric North-West view of the apparatus. It shows the apparatus from the opposite angle.

The process of reinforcing and punching papers is shown FIG. 1 and FIG. 2. When users have a stack of printed documents with page width equal to 11-inches, and the user would like to reinforce and punch them before putting them into a 3-ring binder, the user can place this stack of documents into the in-feed paper tray (3), the printed side down. The user presses a button to start the process, the EPRHP will then perform the following tasks:

The EPRHP takes one page at a time, starting from the bottom of the paper stack. The paper transfer mechanism (8) transfers the paper under the plastic film application station (2A, 2B). It works in a similar way to the paper transfer mechanism in printers and scanners commonly used in offices.

The wax paper rolling station (7) turns and aligns the film edge with the paper edge.

The base plate of the film application station (2B) moves up, and presses the paper and plastic film together against the roller of the film application station (2A). The edge of the film adheres to the paper, since the film's contact side with paper is adhesive.

As shown in FIG. 1, the base plate of the film application station (2B) then moves to the left, its movement turns the roller of the film application station (2A) clockwise. As a result, the film is peeled off from the wax paper and applied firmly on the paper by the roller of the film application station (2A). At the same time, the wax paper rolling station (7) turns and linearly moves the wax paper toward the left exactly 0.75" (since the film is ½" wide and ¼" apart).

The base plate of the film application station (2B) moves down and to the right, back to the start position.

The paper transfer mechanism (8) transfers the paper under the 3-hole puncher (10A), which punches 3 holes on the paper and the applied plastic film.

Remove the paper.

The EPRHP takes another piece of paper and repeats the tasks 1-6.

Figure 5:
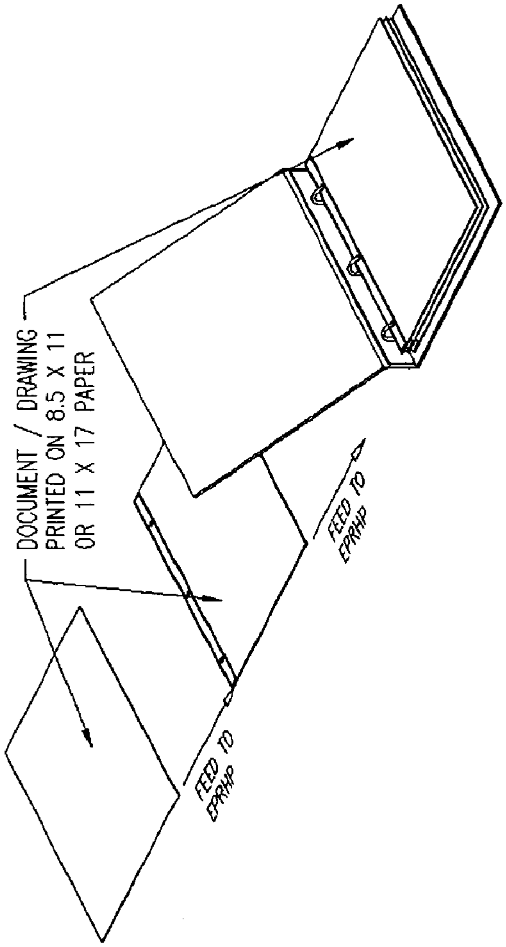
FIG. 5 shows the process of producing a reinforced 3-hole paper document with the EPRHP.
Figure 6:
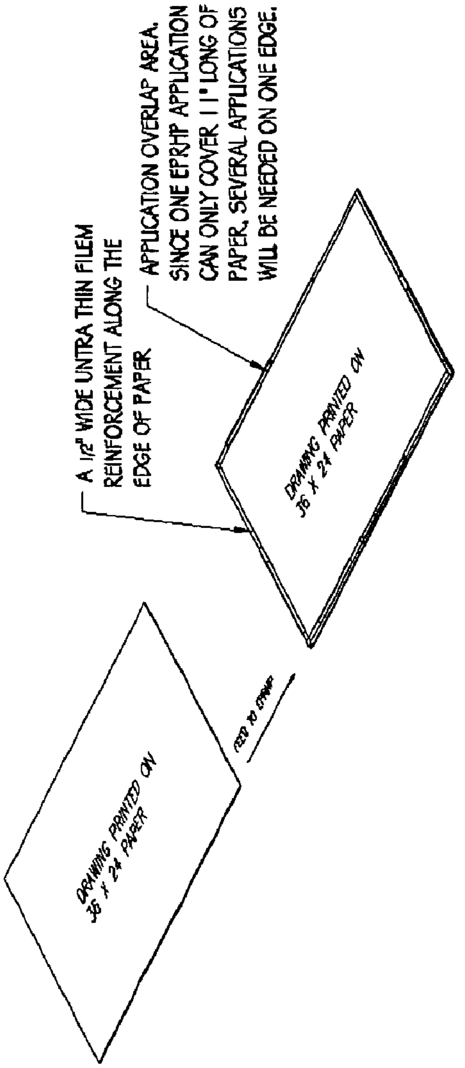
FIG. 6 shows the process of reinforcing a large sized drawing with the EPRHP.

When the EPRHP is used to apply the paper reinforcement on an irregular sized paper, for instance a 36×24 drawing, the user will need to detach the paper in-feed tray (3) from the EPRHP. As a result, the paper transfer mechanism (8) is disabled, and the 3-hole puncher (10A) is disabled also. The user then holds the paper and slides it under the roller of the film application station (2A), and the EPRHP proceeds with the tasks 3-5. Since the EPRHP can only apply an 11" long piece of film, the user will need to move the paper to the left (or right) to allow the EPRHP to apply the film on the other part of paper edge which is not yet covered with the film. For instance, 3 applications will be needed to cover a 24" paper edge, and the applied film will overlap, as shown in FIG. 5. As described in Background of the Invention, manually applying the paper reinforcement on a set of 100 36×24 drawings would take days, while using EPRHP can accomplish the same task in a couple of hours and with a much higher quality.

What is claimed is:

1. A paper reinforcing and hole punching device for applying a reinforcement element, comprising plastic film, on an edge of a piece of printed paper and punching holes comprises: a plastic film application station; a hole punching station; a plastic film-wax paper roll; a wax paper rolling station; a paper feed tray; a paper transfer mechanism.

2. The apparatus of claim 1 can automatically process a stack of printed papers, performing the following tasks: 1. said paper transfer mechanism transfers said printed paper to a position under said plastic film application station; 2. apply said plastic film onto said paper; 3. punch holes on said paper and said plastic film; 4. remove said paper from the apparatus of claim 1 with said plastic film and punched holes on said paper edge.

3. The apparatus of claim 1 can further be used to reinforce paper of various sizes by manually inserting said paper under said plastic film application station, which then applies said plastic film on an edge of said paper, while the function of said hole punching station is deactivated.

4. The apparatus of claim 1 wherein said plastic film application station comprises a roller and an electric base plate, which moves up and presses said paper and said plastic film against said roller, and said base plate moves linearly to apply said plastic film on an edge of said paper.

5. The apparatus of claim 1 wherein said hole punching station is an electric hole puncher that moves up and down to punch holes on said paper and said plastic film after said plastic film is applied on an edge of said paper.

6. The apparatus of claim 1 wherein said plastic film-wax paper roll is a roll of wax paper bonded with a series of 11 inch long, ½ inch wide plastic film strips, spaced ¼" apart; said plastic film strips are transparent and thin plastic film with the sticky side facing up said film strips are easily peeled off from said wax paper; the sticky side of said plastic film strip does not adhere to the reverse side of said wax paper, which allows said plastic film-wax paper to be easily unrolled.

7. The apparatus of claim 6 wherein said wax paper is a piece of wax paper with one side a smooth and adhesive surface, and the other side a smooth and non adhesive surface; said adhesive side bonds to said plastic film of claim 6.

8. The apparatus of claim 1 wherein said paper feed tray is a paper tray that feeds a stack of said papers to said apparatus of claim 1, sequentially from the bottom to the top; this allows said apparatus of claim 1 to reinforce and punch one said paper at a time until the entire stack of said papers in said paper feed tray is reinforced and punched.

9. The apparatus of claim 1 wherein said wax paper rolling station is an electric roller that rolls said wax paper in correspondence with the motion of said plastic film application station of claim 1; this allows said apparatus to apply said plastic film on an edge of said paper.

10. The apparatus of claim 1 wherein said paper transfer mechanism is an electric paper transfer system to transfer said paper from said paper feed tray to said apparatus for application of reinforcement element and hole punching; it then transfers the papers out of said apparatus after said papers are reinforced and punched.

* * * * *